United States Patent
Trainin et al.

(10) Patent No.: US 9,220,099 B2
(45) Date of Patent: Dec. 22, 2015

(54) METHOD OF PROTOCOL ABSTRACTION LEVEL (PAL) FREQUENCY SYNCHRONIZATION

(71) Applicant: INTEL CORPORATION, Santa Clara, CA (US)

(72) Inventors: Solomon Trainin, Haifa (IL); Etan Shirron, Hod-Hasharon (IL); Yaniv Frishman, Kiryat Ono (IL)

(73) Assignee: INTEL CORPORATION, Santa Clara, CA (US)

( * ) Notice: Subject to any disclaimer, the term of this patent is extended or adjusted under 35 U.S.C. 154(b) by 354 days.

(21) Appl. No.: 13/728,802

(22) Filed: Dec. 27, 2012

(65) Prior Publication Data

US 2013/0279467 A1 Oct. 24, 2013

Related U.S. Application Data

(60) Provisional application No. 61/637,577, filed on Apr. 24, 2012.

(51) Int. Cl.
*H04W 72/04* (2009.01)
*H04W 56/00* (2009.01)

(52) U.S. Cl.
CPC ...... *H04W 72/0446* (2013.01); *H04W 56/0035* (2013.01)

(58) Field of Classification Search
None
See application file for complete search history.

(56) References Cited

U.S. PATENT DOCUMENTS

| 2003/0169774 | A1* | 9/2003 | Del Prado et al. | 370/503 |
|---|---|---|---|---|
| 2005/0152330 | A1* | 7/2005 | Stephens et al. | 370/350 |
| 2010/0316001 | A1* | 12/2010 | Enstrom et al. | 370/328 |
| 2011/0116487 | A1 | 5/2011 | Grandhi | |
| 2011/0216747 | A1 | 9/2011 | Shao et al. | |

FOREIGN PATENT DOCUMENTS

| EP | 2293629 A1 | 3/2011 |
|---|---|---|
| WO | 2011/082297 A2 | 7/2011 |
| WO | 2013/163001 A1 | 10/2013 |

OTHER PUBLICATIONS

International Search Report and Written Opinion Received for PCT Application No. PCT/US2013/037189, mailed on Jul. 29, 2013, 9 pages.
International Preliminary Report on Patentability and Written Opinion for corresponding International Application No. PCT/US2013/037189, mailed on Oct. 28, 2014 (5 pages).

* cited by examiner

*Primary Examiner* — Faruk Hamza
*Assistant Examiner* — Tito Pham
(74) *Attorney, Agent, or Firm* — Ellis B. Ramirez; Prass LLP

(57) ABSTRACT

Embodiments of wireless devices and methods to support a clock synchronization protocol that is provided independently and in parallel to multiple protocol abstraction level (PAL) and other upper layer entities and to multiple streams per each of the PAL and the upper layer entities. The frequency and time synchronization messages are delivered by MAC management action frames and can be aggregated in A-MPDU together with data, management and control MPDUs.

5 Claims, 6 Drawing Sheets

| Category | Action | Dialog Token | Upper Layer Timer Delta | MAC Timer Delta | Upper Layer Timer TOD | MAC Timer TOD | U-PID |
|---|---|---|---|---|---|---|---|
| 1 | 1 | 1 | 4 | 4 | 4 | 4 | Variable |

*FIG. 5*

METHOD OF PROTOCOL ABSTRACTION LEVEL (PAL) FREQUENCY SYNCHRONIZATION

BACKGROUND

1. Field of the Disclosed Embodiments

The present invention relates generally to PAL (Protocol Abstraction Level) and to MAC (Media Access Control) devices that source and sink data and, more particularly, the present invention relates to a signaling method to support synchronization at a higher-layer protocol.

2. Introduction

The demand for increasing data transfer rates between devices is ever increasing, and in particular, wireless data transfer rates through a wireless media (WM). To meet the demand for increasing wireless data transfer rates, a new high-speed wireless standard WiGig is under development. WiGig facilitates communication between wireless communications systems operating in the 60 GHz band for devices such as computing, entertainment, and communications devices, including, televisions, stereos, personal digital assistants (PDA), mobile telephones, media playing devices, gaming devices, personal computers, laptop computers, and any another suitable wireless communication device. For example, WiGig products may transfer data in a range of approximately 1 Gigabits per second (Gbps) to 6 Gbps, within a range of less than 50 meters, i.e., within a single room. The WiGig Affiance has published Protocol Abstraction Layer (PAL) specifications for the WiGig Display Extension (WDE), the WiGig Serial Extension (WSE), the WiGig Bus Extension (WBE), and the MAC/PHY.

An amendment IEEE 802.11ad to the IEEE standard specifies MAC and PHY for 60 GHz spectrum.

Optimal wireless transfer rates for WiGig devices are difficult to achieve with current wireless media. WM (Wireless Media) is less reliable than wire and there are multiple wireless specific mechanisms that are used to compensate the WM reliability gaps. Some examples of the known mechanisms are: acknowledgement of transmitted frames, retransmission of frames that are not acknowledged, adaptation of Modulation and Coding schemes used for the frame transmission, block acknowledgement, beamforming of phase array antennas etc. However, the mentioned mechanisms introduce additional latency in the data delivery and, in many cases, this latency is variable (jitter). Additionally, current MAC solutions do not mitigate the internal PAL2MAC jitter and do not provide a solution to streams with different clocks such as needed with video and audio streams.

DETAILED DESCRIPTION OF THE DISCLOSED EMBODIMENTS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 shows a proposed Frequencies Synchronization frame in accordance to an embodiment.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "Source device" as used herein refers to a device that is the source of Audio or video (AV) streams. Examples of source devices are personal computers (PCs), AV servers, Camcorders, a settop box (STB), a digital video recorder (DVR), a still or video camera, a game console, a cellphone or smartphone, a personal digital assistant (PDA), digital video disc DVD or blue-ray disc (BD) players and other devices.

The term "Sink devices" as used herein refers to devices that terminate an AV stream by rendering the content such as displaying. Examples of sink devices may be televisions, receivers, displays, monitors, speakers, printers, laptop or personal computers, cell phones or smartphones, personal digital assistants (PDAs), projectors, and other devices.

Figure 1:
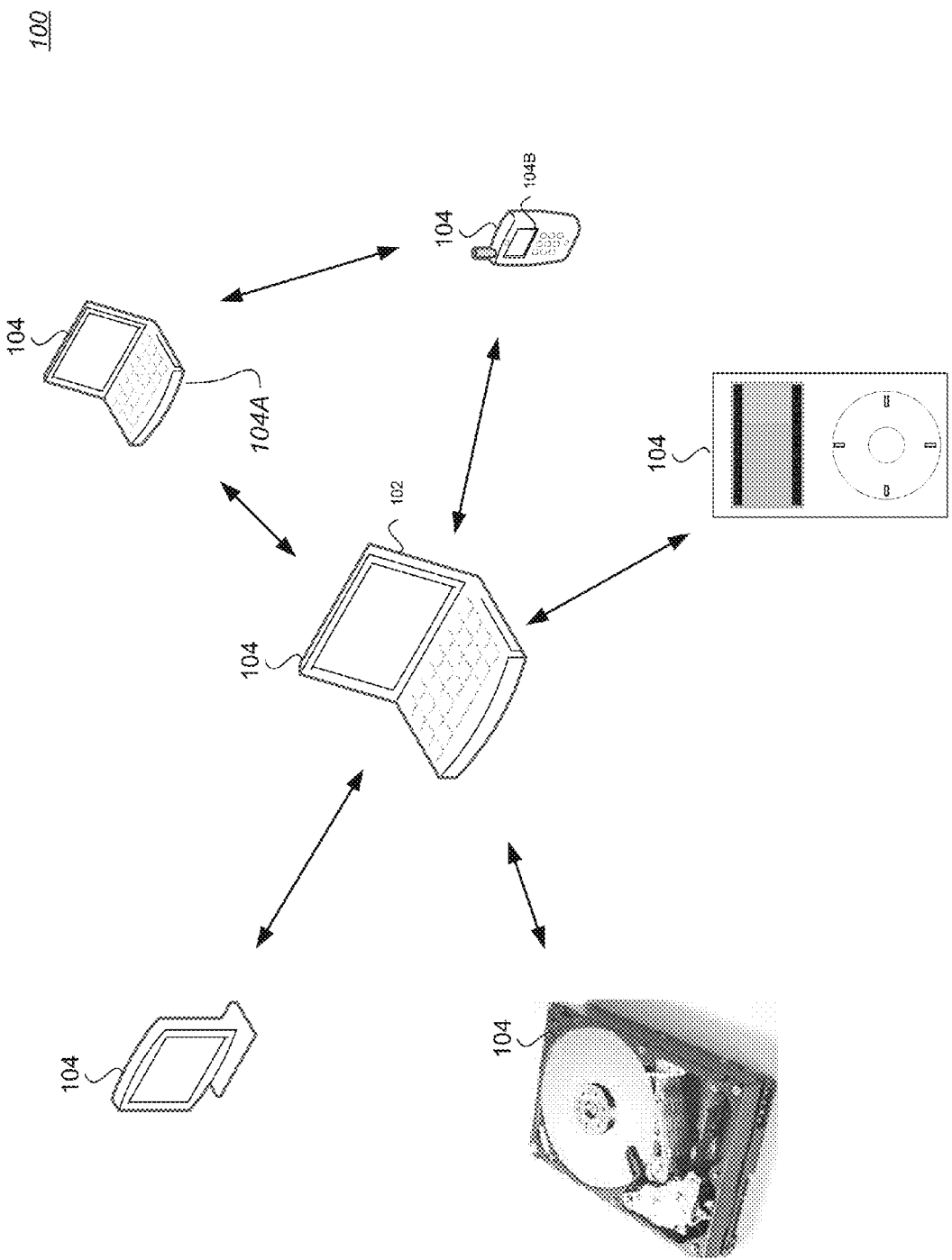
FIG. 1 illustrates a wireless network in accordance to an embodiment.

FIG. 1 illustrates a mmW basic-service set (BSS), in accordance with some embodiments. The mmW BSS 100 includes a plurality of mmW stations 104 that may communicate using millimeter waves. One of the mmW stations 104, the central coordinator 102, may operate as central coordinator for the mmW BSS 100 to coordinate communications among the mmW stations 104 and control access to the wireless medium.

In some embodiments, the central coordinator 102 may broadcast a beacon frame that indicates the length of a beacon interval during which communications are to take place. The beacon frame may be received by the other mmW stations 104, thereby allowing the other mmW stations 104 to know when the next beacon interval will occur. The central coordinator 102 and the mmW stations 104 may utilize directional antennas and may employ beamforming, beam steering or beam directing techniques to engage and maintain communication. These embodiments are described in more detail below.

In accordance with some embodiments, a simplified and unified frame-format scheme for both station and information discovery is provided. The frame-format scheme may be suitable for use in both a mmW WPAN and a mmW WLAN. As described in more detail below, through the use of a station-capability information element, an information-request action frame, and an information-response action frame, the mmW stations 104 of the mmW BSS 100 may be able to discover each other and exchange station-capability information so that non-central coordinator devices, such as mmW station 104A and mmW station 104B, can communicate directly in a peer-to-peer (P2P) manner.

In some embodiments, the central coordinator 102 and the mmW stations 104 are configured to operate as part of a personal BSS (PBSS). The central coordinator 102 may be a PBSS control point (PCP) operating as a central coordinator for the PBSS, and the PBSS may be configured to operate in accordance with a Wireless Gigabit Alliance (WiGig or WGA) specification or an IEEE 802.11 specification such as the Task Group ad (IEEE 802.11ad) draft specification for multi-gigabit speed wireless communications technology operating over an unlicensed 60 GHz frequency band. The PBSS may be configured to operate in accordance with the WiGig Media-Access Control (MAC) and Physical Layer (PHY) specifications, version 1.0 or later, although this is not a requirement. The WiGig Affiance has published Protocol Abstraction Layer (PAL) specifications for the WiGig Display Extension (WDE), the WiGig Serial Extension (WSE), the WiGig Bus Extension (WBE), and the MAC/PHY specification. In some other embodiments, the PBSS may be configured to operate in accordance with an IEEE 802.15.3 specification for high-rate WPANs, including the IEEE 802.15.3 Task Group 3c (TG3c).

In some embodiments, the central coordinator 102 and the mmW stations 104 comprise an infrastructure BSS. The central coordinator 102 may be an access point (AP) operating as a central coordinator for the BSS. The BSS may be configured to operate in accordance with the WiGig specification or the IEEE 802.11ad specification referenced above.

The mmW stations 104 may include wireless display devices, laptop and portable computers, mobile communication devices (e.g., cell phones, smart phones or personal digital assistant (PDAs), hard drives and other storage devices, digital audio players (e.g., MP3 players), web tablets, wireless headsets, pagers and instant messaging devices, digital cameras, televisions, medical devices (e.g., a heart rate monitor, a blood pressure monitor, etc.), or other device that may receive and/or transmit information using millimeter waves.

Through the use of the frame-format scheme described herein, the mmW stations 104 may discover each other and exchange station-capability information, which may allow for P2P communications there between. For example, wireless docking and sync & go techniques for a laptop computer may be achieved. Furthermore, a laptop computer will be able to determine that a wireless display device is indeed a display and not a wireless hard drive, for example, which will allow for wireless use of the display by the laptop computer. A cell phone may be able to discover and determine the capabilities of an MP3 player so that it can synchronize music files with the MP3 player. The mmW stations 104 associated with a laptop (which may be operating as the central coordinator 102) may be able to discover each other, learn each other's capabilities, and subsequently establish wireless connections therebetween.

Figure 2:
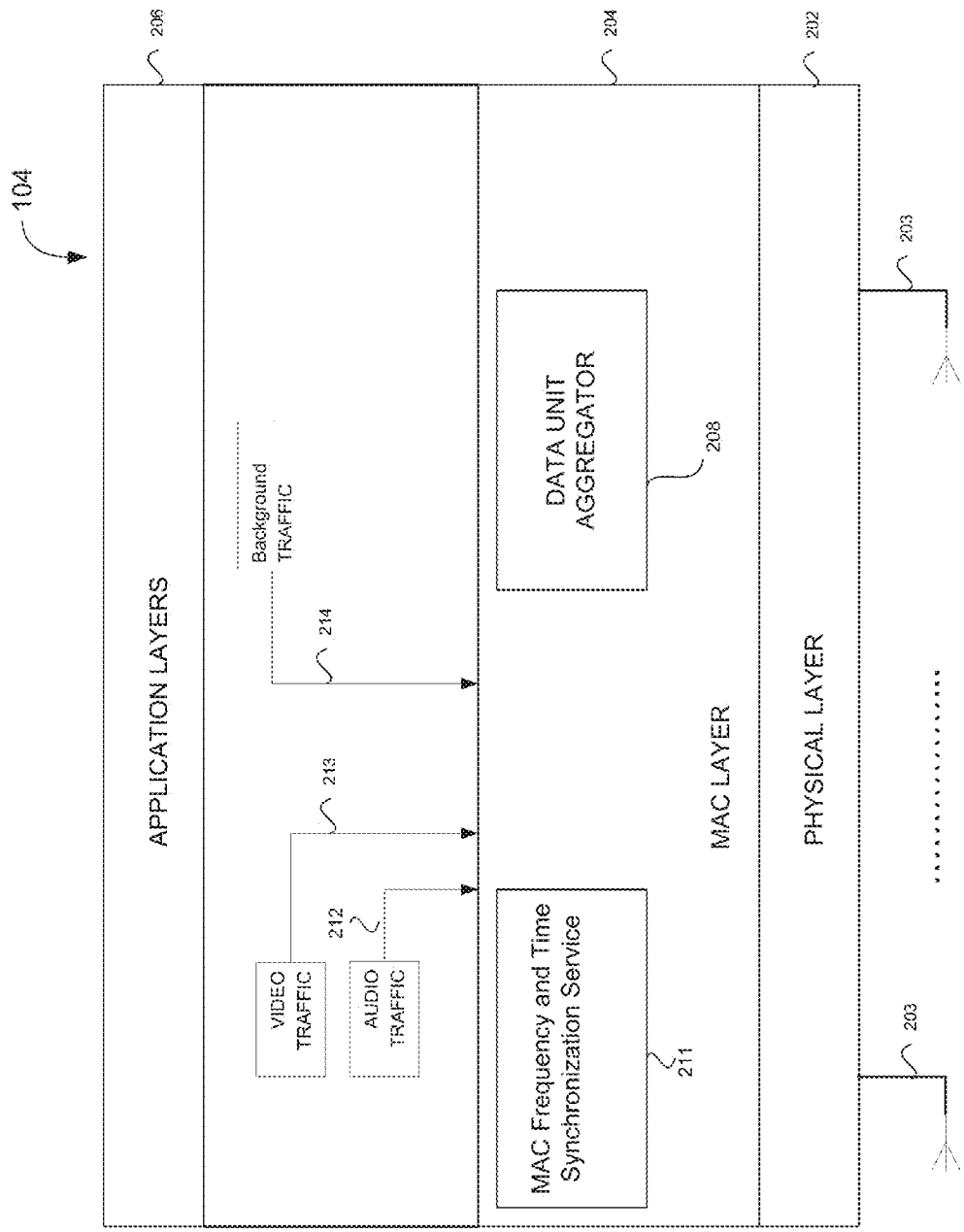
FIG. 2 is a block diagram of a station in accordance to an embodiment.

FIG. 2 is a block diagram of a station in accordance with some embodiments of the present invention. Station 104 may be suitable for use as central coordination station 102 (FIG. 1) and may include physical layer 202, media-access control (MAC) layer 204, and one or more other layers including one or more application layers 206. Antennas 203 may be used to receive and/or transmit radio-frequency (RF) communication signals with mobile stations 104 (FIG. 1). Physical layer 202 may convert bit streams from MAC layer 204 to RF signals for transmission by antennas 203, and may convert received RF signals to bit streams for MAC layer 204. Application layer(s) 206 may provide traffic to and from one or more applications to MAC layer 204, including audio traffic 212, video traffic 213, and/or background traffic 214.

In accordance with some embodiments, MAC layer 204 may include data unit aggregator 208 to aggregate traffic and generate PHY data units, including aggregated data units. The operations of physical layer 202 and MAC layer 204 facilitate communication with other stations in a topology of stations. MAC layer 204 may also include a MAC Frequency and Time Synchronization Service 211 to provide, independently and in parallel to multiple PAL and other Upper Layer entities and to multiple streams per each of the PAL and the Upper Layer entities, a synchronization service. The Frequency and Time synchronization messages are delivered by MAC management action frames and can be aggregated in an aggregated MAC protocol data unit (A-MPDU) together with data, management and control MPDUs. The solution minimizes impact of jitter caused by latency and jitter introduced by the wireless media (WM) and jitter caused by the interaction of upper layer and MAC layer traffic (PAL2MAC).

Although base station 104 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of base station 104 may refer to one or more processes operating on one or more processing elements.

Antennas 203 may comprise one or more directional or omnidirectional antennas, including, for example, dipole antennas, monopole antennas, patch antennas, loop antennas, microstrip antennas, phased array antennas or other types of antennas suitable for transmission of RF signals. In some multiple-input, multiple-output (MIMO) embodiments, two or more antennas may be used. In some embodiments, instead of two or more antennas, a single antenna with multiple apertures may be used. In these embodiments, each aperture may be considered a separate antenna. In some embodiments, each antenna may be effectively separated to take advantage of spatial diversity and the different channel characteristics that may result between each of antennas 203 and another wireless communication device. In some embodiments, antennas 203 may be separated by up to $\frac{1}{10}$ of a wavelength or more, although the scope of the invention is not limited in this respect.

Figure 3:
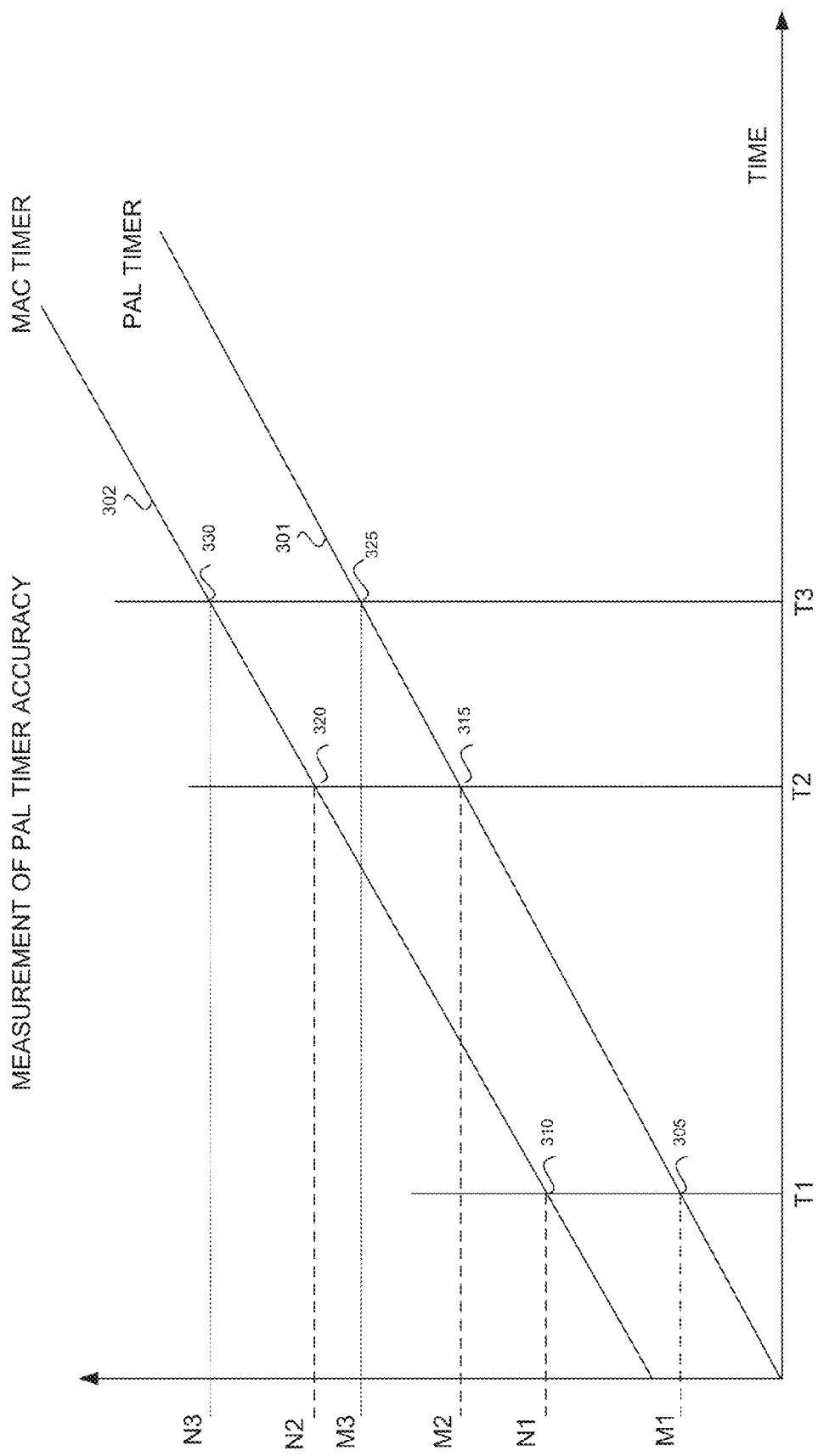
FIG. 3 illustrates a relationship between MAC timer and PAL timer in accordance to an embodiment.

FIG. 3 illustrates a relationship between MAC timer and PAL timer in accordance to an embodiment. FIG. 3 is able to show that an Upper Layer clock generally represented by PAL timer 301 can be mapped to a MAC clock generally represented by MAC timer 302. For example Upper Layer clock 305 (M1) coincides to MAC clock 310 (N1) at a time T1. A second Upper Layer clock 315 (M2) coincides with MAC clock 320 (N2) at a time T2. PAL timer accuracy may be measured as ((M2−M1)/(N2−N1)) from the PAL and MAC timer data. In this way a source station can deliver to a sink station a delta of Upper Layer clock measured by MAC clock so as to support synchronization among higher-layer protocol entities residing within different devices or higher-layer protocol and MAC entities. A third Upper Layer clock 325 (M3) coincides with MAC clock 330 (N3) at time T3. PAL timer accuracy may be measured or updated with M3 and N3.

Figure 4:
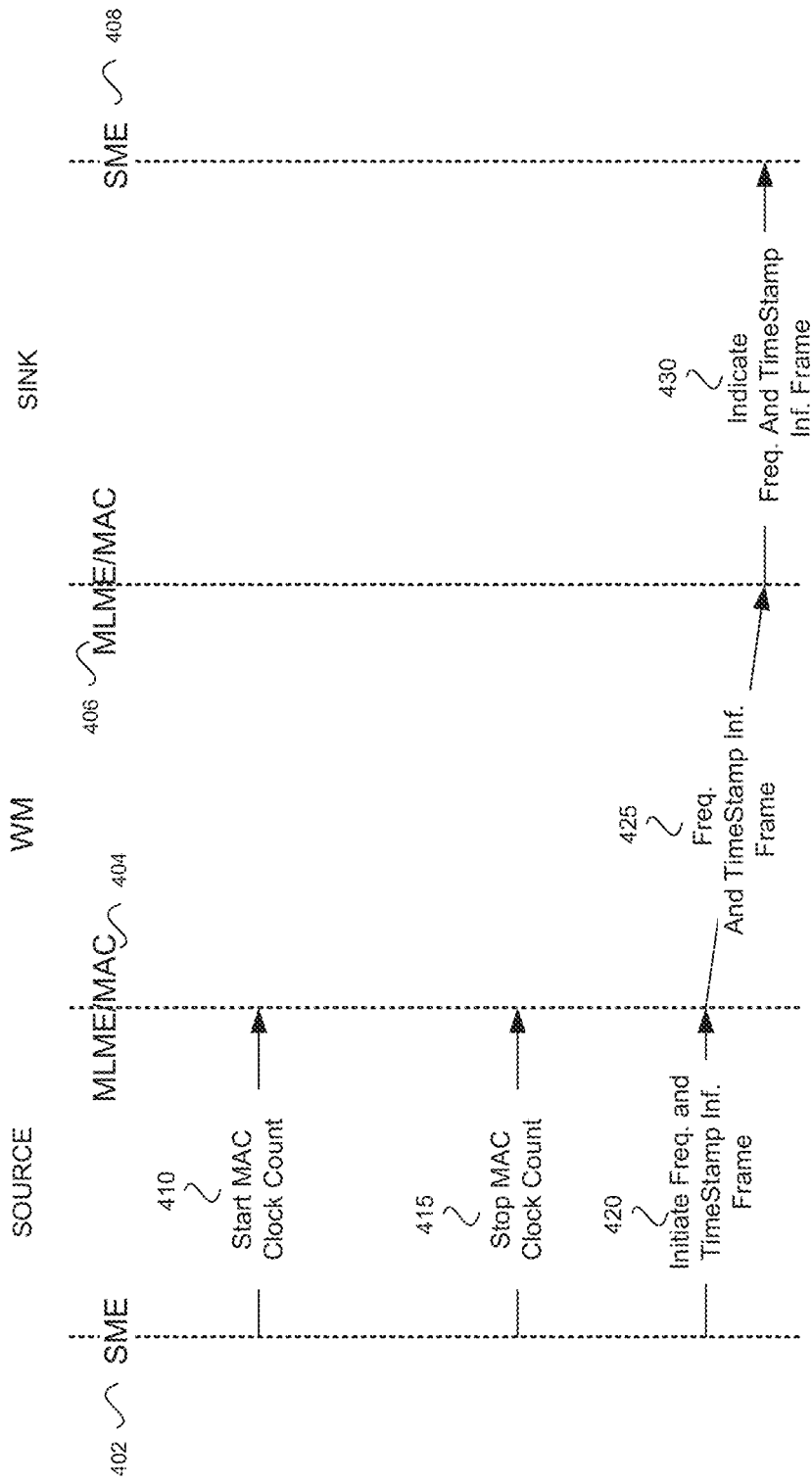
FIG. 4 is a diagram illustrating a MAC synchronization mechanism in accordance to an embodiment.

FIG. 4 is a diagram illustrating a MAC synchronization mechanism in accordance to an embodiment. In accordance with an exemplary embodiment of the present invention the SME and MLME (MAC subLayer Management Entity) cooperate to deliver from MAC Source to MAC Sink information about delta of Upper Layer clock measured by MAC clock and to deliver from MAC Source to MAC Sink Upper Layer Clock Timestamp, and identify clocks of the different Upper Layers and Upper Layer specific streams. Starting with a source station, each STA includes a station management entity (SME) 402 having a MAC interface for transceiving upper layer clock primitives to a MLME entity 404 to convert between primitives and MAC frames and to issue a MAC management action frame. A physical layer interface (not shown) transceives the primitive-converted MAC frames and MAC management action frame that be aggregated in A-MPDU together with data, management and control MPDUs. The MLME manages the MAC layer and controls interactions with the SME. A physical layer (PHY) entity such as physical layer 202 transceives the frames to another physical layer interface (not shown) at a sink station which through MLME entity 406 delivers the information in the frames to a SME 408 at the sink station. Typically, the PHY entities at the source and sink stations communicate via a wireless link.

SME 402 issues a start MAC clock count 410 and stop MAC clock count 415 primitives. Start MAC clock count primitive 410 conveys Upper Layer clock value (M1) at time (T1) of the primitive issue and latches value of MAC clock (N1) at the time of the primitive issue. The Stop MAC clock count primitive 415 conveys Upper Layer clock (M2) value at time (T2) of the primitive issue and latches value of MAC clock (N2) at time of the primitive issue. At MLME 404 a new Frequency and Synchronization frame is formulated from the start MAC and the stop MAC primitives. A frequency measurement request primitive 420 initiates transmission of the frame. As noted earlier the frames can be aggregated with other traffic. The Frequency and Timestamp frame 425, 500 is communicated via a wireless media (WM). At MLME 406 a frequency measurement indication primitive 430 is issued to delivers the Frequencies Synchronization Information covered in the 500, Time of Arrival such as MAC clock and Upper Layer clock to the SME at the sink station. Each primitive conveys indication of Upper Layer and Upper Layer stream the primitive belongs to.

FIG. 5 is a diagram illustrating the contents and structure of a Frequencies Synchronization (FS) frame 500 according to one aspect. While aspects may be described in relation to the IEEE 802.11 standard, it will be appreciated that the various aspects may be implemented according to the specifics of other communications protocols as well. The FS frame 500 is used to support the timing measurement procedure as discussed with reference to FIG. 3. The FS frame 500 includes a category 510, action 520, dialog token 530, upper layer timer delta 540, MAC timer delta 550, upper layer timer TOD 560, MAC timer TOD, and U-PID 580 field.

The Category field 510 is the value indicating the DMG category (16) for Frequency and Time synchronization field. The Frequency and Time synchronization field is set to "1" if the STA supports Frequency and Time synchronization and is set to "0" otherwise.

The Action field 520 is the value (8) indicating Frequency Synchronization as specified in DMG Action field value.

The Dialog Token field 530 is set to a nonzero value chosen by the STA sending the Frequency Synchronization Frame to identify the transaction.

The FS frame 500 contains several Upper Layer and MAC timing parameters that are used to synchronize Upper Layer sink to Upper Layer source.

The MAC timer delta field 550 (N2−N1) contains number of the MAC clocks during the period indicated in the Upper Layer timer delta field 540 (M2−M1).

The Upper Layer timer TOD field 560 (M3) is set to the value of the STA's Upper Layer timer at the time that the transmission of data symbol containing the first bit of the MPDU or A-MPDU is started on the air, which should include any transmitting STA's delays through its local PHY from the MAC-PHY and Upper Layer-MAC interface to its interface with the WM.

The MAC timer TOD field 570 (N3) is set to the value of the STA's MAC timer at the time that the transmission of data symbol containing the first bit of the MPDU or A-MPDU is started on the air, which should include any transmitting STA's delays through its local PHY from the MAC-PHY interface to its interface with the WM.

Figure 6:
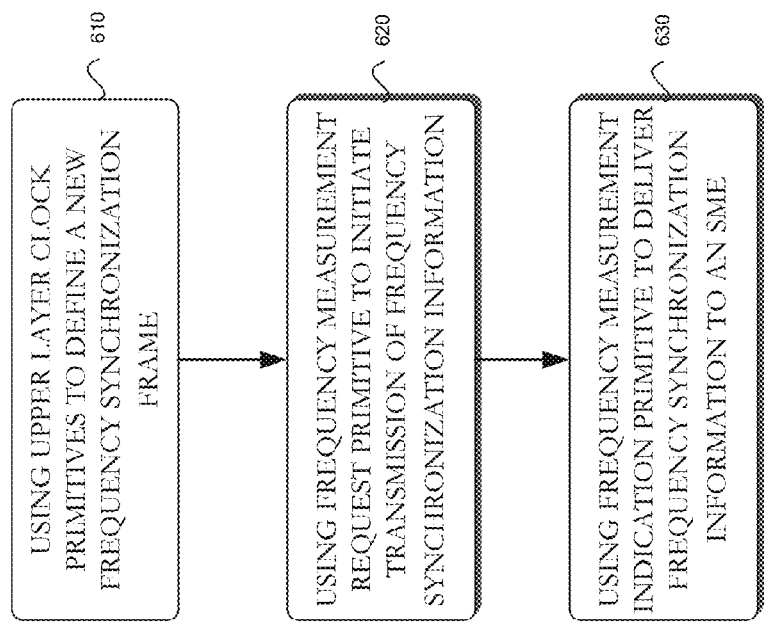
FIG. 6 is a flowchart of a method for Frequency Synchronization information in accordance to an embodiment.

The Indication of Upper Layer field 580 contains Upper Layer ID and Upper Layer stream ID the timer belongs FIG. 6 is a flowchart of a method 600 for Frequency Synchronization information in accordance to an embodiment. Method 600 begins with action 610 where a source station uses upper layer clock primitives to define a new frequency synchronization frame. The method then continues with action 620 where a source station uses frequency measurement request primitive to initiate transmission of frequency synchronization information. Method 600 continues with action 630 where a sink station uses frequency measurement indication primitive to deliver frequency synchronization information to an SME at the sink station.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A millimeter-wave (mmW) wireless system, the system comprising:
   at least a pair of stations that source or sink data, each station (STA) including:
   a station management entity (SME) having a MAC interface to transceive upper layer clock primitives, wherein an upper layer clock primitive is at least one of start MAC clock count primitive, stop MAC clock count primitive;
   wherein the start MAC clock count primitive conveys an Upper Layer clock value (M1) at time (T1) and latches value of MAC clock (N1) at the time of issue of the start MAC clock count primitive;
   wherein the stop MAC clock count primitive conveys Upper Layer clock (M2) value at time (T2) and latches value of MAC clock (N2) at time of issue of the stop MAC clock count primitive; and,
   a MAC entity that transceive frequency measurement primitives, a processor that convert between primitives and MAC frames, and a physical layer interface that transceive primitive-converted MAC frames;
   wherein STA MAC entities use a MAC management action frame to communicate frequencies synchronization information.

2. The system in accordance to claim 1, wherein a frequency measurement primitive is at least one of frequency measurement request primitive, frequency measurement indication primitive.

3. The system in accordance to claim 2, wherein the frequency measurement request primitive initiates transmission of the MAC management action frame that contains the frequencies synchronization information.

4. The system in accordance to claim 3, wherein the frequency measurement indication primitive delivers the frequencies synchronization information to an SME in a STA that source or sink data.

5. The system in accordance to claim 4, wherein the MAC management action frame contains at least one category field, action field, dialog token field, Upper Layer timer delta field, MAC timer delta field, Upper Layer timer TOD field, MAC timer TOD field, or Upper Layer protocol identification field.

* * * * *